US011570965B2

(12) United States Patent
Shams

(10) Patent No.: US 11,570,965 B2
(45) Date of Patent: Feb. 7, 2023

(54) COCONUT-BASED COMPOSTABLE DOG WASTE COLLECTING SYSTEM

(71) Applicant: Yashar Shams, White Rock (CA)

(72) Inventor: Yashar Shams, White Rock (CA)

( * ) Notice: Subject to any disclaimer, the term of this patent is extended or adjusted under 35 U.S.C. 154(b) by 111 days.

(21) Appl. No.: 16/938,768

(22) Filed: Jul. 24, 2020

(65) Prior Publication Data
US 2021/0022311 A1     Jan. 28, 2021

Related U.S. Application Data

(60) Provisional application No. 62/878,075, filed on Jul. 24, 2019.

(51) Int. Cl.
*A01K 1/01*     (2006.01)
*A01K 1/015*     (2006.01)

(52) U.S. Cl.
CPC .......... *A01K 1/0107* (2013.01); *A01K 1/0155* (2013.01); *A01K 1/0157* (2013.01)

(58) Field of Classification Search
CPC ............................ A01K 1/0107; A01K 1/0155
See application file for complete search history.

(56) References Cited

U.S. PATENT DOCUMENTS

| | | | | |
|---|---|---|---|---|
| 4,541,360 A * | 9/1985 | Higgins | ................ | A01K 1/0125 |
| | | | | 119/168 |
| 5,819,688 A * | 10/1998 | Walker | ................. | A01K 1/0107 |
| | | | | 119/169 |
| 2003/0070623 A1 * | 4/2003 | MacQuoid | ........... | A01K 1/0152 |
| | | | | 119/171 |
| 2007/0163513 A1 * | 7/2007 | Lingmann | ............ | A01K 1/0155 |
| | | | | 119/526 |
| 2012/0006274 A1 | 1/2012 | Feld | | |
| 2013/0269624 A1 * | 10/2013 | Ryu | ..................... | A01K 1/0107 |
| | | | | 119/171 |
| 2016/0029589 A1 | 2/2016 | Norman | | |
| 2018/0050857 A1 * | 2/2018 | Collison | .............. | B65D 5/0227 |
| 2018/0264481 A1 * | 9/2018 | Limbaugh | .......... | B01J 20/28004 |
| 2020/0281155 A1 * | 9/2020 | Axelrod | .................. | B32B 27/32 |

OTHER PUBLICATIONS

Conserve Energy Future, https://www.conserve-energy-future.com/is-cardboard-compostable.php (Year: 2022).*

* cited by examiner

*Primary Examiner* — Joshua D Huson
*Assistant Examiner* — Alanna K Peterson

(57) ABSTRACT

A dog waste collecting system that is fully compostable or biodegradable, and fully sustainable. The system is made of a cardboard box, a biodegradable liner, an optional cardboard cell divider, an absorbent coconut layer and a retaining coconut fiber mat that keeps the absorbent layer in place. The absorbent coconut layer absorbs the dog waste fluids while the coconut fiber mat holds the dog waste solids for removal by the owner. Perforations in the box define a lid that is removed prior to use to expose the mat. The system, after a few weeks of use, can be directly discarded in whole, in the compost.

11 Claims, 6 Drawing Sheets

COCONUT-BASED COMPOSTABLE DOG WASTE COLLECTING SYSTEM

TECHNICAL FIELD

The present invention is related to a system for collecting dog waste. More specifically, it relates to a system for collecting dog waste that is entirely biodegradable and fully compostable, and able to capture odors from the dog waste using coconut material.

BACKGROUND

In an urbanized environment, pet owners do not necessarily have a garden space to take their dogs out in order for them to defecate and/or urinate. In addition, when living in an apartment, dog owners have to find the time for going out with their dog in order to lead it to defecate and/or urinate in the appropriate place. This could also be a problem in the case of bad weather. Older dogs that have a limited walking ability due to the lack of strength or other illnesses need a portable device. Portable devices are also useful for puppy training for any breed of dog.

U.S. patent application No. 2012/00006274 to Feld relates to a portable pet toilet system. The system is made of a box filled with living grass, living sod or a grass seed medium. The system is fully disposable and does not require any cleaning, except for removing solids.

Canadian patent application No. 2891893A1 to Norman relates to a pet waste system. In this system, the litter is protected from the dog by a plastic netting system. Therefore, the dog cannot kick the litter material out of the system. The system involves litter made of an organic, non-living material. The netting system used to retain the litter material in the system may not be recyclable or compostable. Once this netting system is in the landfill, it may cause harm to wildlife that may get stuck or tangled in the netting. The leak proof tray is recyclable, however, disassembly of the pet waste system is required to appropriately recycle the unit.

This background is not intended, nor should be construed, to constitute prior art against the present invention.

SUMMARY OF INVENTION

The present invention is related to a system for collecting dog waste that is fully disposable, biodegradable and compostable. Furthermore, the system is non-living, which reduces the likelihood of bugs being brought into the home. As the system is fully disposable, it can be replaced with a new one after every few weeks of use. Moreover, it is made of materials that can be degraded quickly over time through exposure to an outdoor environment. The system may also be used to train dogs even in houses with back yards. The system, or unit, is shelf stable in retail stores, and does not contain any bugs that can escape the unit. The unit is disposable, replaceable, with no cleaning, assembly or disassembly required except for removing solid waste.

The system has two main layers: a lower, absorbent layer and an upper, retaining layer, which may exhibit lesser absorption, both made from different parts of a coconut. The underlying absorbent layer is covered by the retaining layer, which is porous, and allows liquids to pass though.

Disclosed is a system for collecting dog waste comprising: a biodegradable receptacle; a biodegradable leak proof liner inside the receptacle; a biodegradable absorbent coconut layer placed on the leak proof liner; and a biodegradable coconut fiber mat over the biodegradable absorbent coconut layer.

Also disclosed is a method for making a dog waste collecting system comprising: providing a biodegradable receptacle; providing a biodegradable leak proof liner inside the receptacle; placing a biodegradable absorbent coconut layer on the leak proof liner; placing a biodegradable coconut fiber mat over the absorbent coconut layer; and closing the biodegradable receptacle with a biodegradable closure, the biodegradable closure comprising a biodegradable lid or a biodegradable sleeve.

BRIEF DESCRIPTION OF THE DRAWINGS

The following drawings illustrate embodiments of the invention, which should not be construed as restricting the scope of the invention in any way.

DESCRIPTION

A. Glossary

The term "compostable" refers to a material that has the ability to be decomposed into organic matter over time. This organic matter can then serve as a fertilizing soil. Biodegradable materials, which are not necessarily compostable themselves, may form part of an item that is otherwise compostable, and as a result, the entire item can be considered to be compostable.

The term "biodegradable" refers to a material that can be broken down or deteriorated when exposed to microorganisms in order to result in smaller, non-toxic byproducts. Biodegradable materials may be included in compost, but they are not necessarily intended to fertilize the soil.

The term "husk" in relation to a coconut refers to the thick fibrous layer of a coconut that is attached to the hard shell that surrounds the edible part of the coconut.

The term "shell" in relation to a coconut refers to the hard shell between the edible part of the coconut and the husk.

The term "skin" in relation to a coconut refers to the thin outermost coat, or exocarp, of the coconut.

The term "coconut mat", or "coconut fiber mat", refers to a mat made from fibers of coconuts obtained from the coconut husk. Mats made of tightly woven coconut fibers may be used for growing microgreens, herbs, micro-herbs and may be used as a base for grow trays. Natural rubber is used as a glue to give the mat a strong hold.

The term "coconut soil" refers to ground coconut shell. It also refers to a ground coconut shell and ground coconut husk combination.

The term "coconut sponge" refers to a sponge-like structure made from dry, ground coconut shells and husks. The ground up coconut shells and husks go through a special treatment that slightly compresses the ground up coconut shells and husks and mixes it with a binder to form the sponge.

The term "coconut brick" refers to a brick made from compressed coconut soil.

B. Exemplary Embodiments

Figure 1:
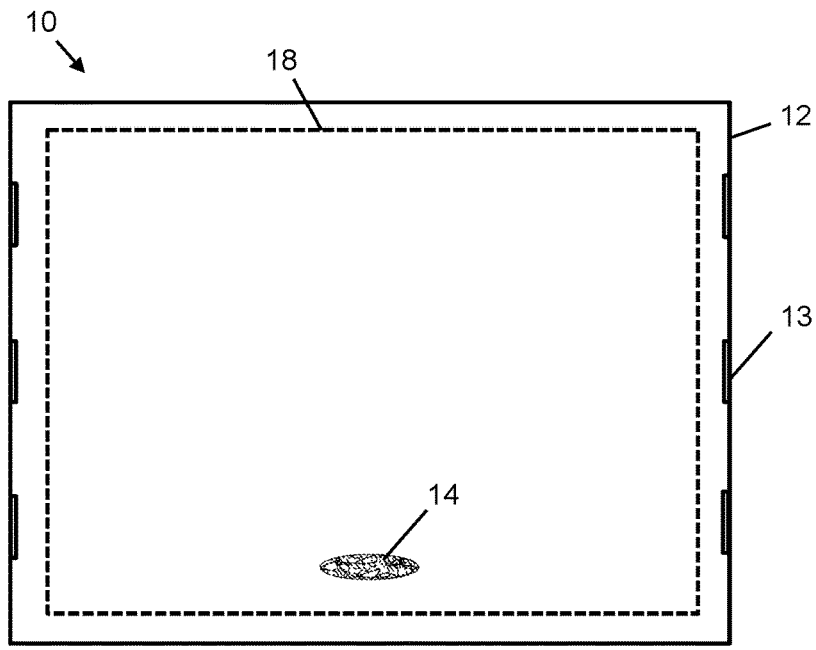
FIG. 1 is a drawing representing a system for collecting dog waste according to an embodiment of the present invention, as seen from above.

Referring to FIG. 1, there is shown an embodiment of the system 10 for collecting dog waste. The system 10 is made of a box 12 that is fully biodegradable. The box 12 may also be fully compostable. The box 12 is made of a biodegradable material such as cardboard. The box 12 is held closed by folded flaps 13 that tuck into the sides of the box, for example, although other ways of closing the box are possible in other embodiments. The system 10 is generally dry, has a relatively long shelf-life, can be stored in warehouses, and can be bought by dog owners in bulk.

The top surface of the system 10 has an opening 14 (or an openable portion) and perforations that delineate the lid 18 of the box. By holding and pulling the lid 18 with a finger through the opening 14, the lid of the system 10 can be detached to leave a pad. When the lid 18 of the box is detached, the pad that is left may include parts of the box. The dog can then use the pad of the system 10 for urination or defecation.

In other embodiments, there may be an alternate feature to the opening 14 for pulling off the lid 18 from the system 10. For example, there may be a cardboard flap attached to the top surface of the lid 18. In other embodiments, there may be a perforation that defines the opening 14. The piece of cardboard within this perforation can then be pushed inwards at one end, a finger can be inserted into the hole that is formed and the lid 18 pulled off.

Figure 2:
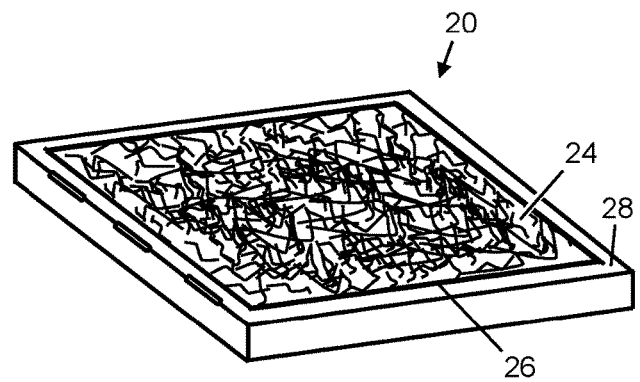
FIG. 2 is a drawing representing a perspective view of a pad for collecting dog waste, according to an embodiment of the present invention.

Referring to FIG. 2, the pad 20 resulting from the lid 18 being detached from the system 10 is shown. A mat 24 is exposed in the opening 26 in the top panel 28 of the box 20. The mat 24 is made of coconut fibers. The coconut fibers are made from fibers collected from the husk of the coconut. A biodegradable glue such as a soy adhesive, vegetable-based adhesive, or natural rubber adhesive is used to glue the coconut fibers together. In some embodiments, a compostable, water-based adhesive is used to bind the coconut fibers together. The mat 24 may be made to be rip resistant. In some embodiments, the mat 24 is made of other absorbent, biodegradable and compostable material. The dimensions of the mat 24 are, in some embodiments, 61 cm×61 cm×0.6 cm (24"×24"×W). The size of this exemplary mat does not limit the invention to that size only.

The mat 24 is porous and has pores or small circuitous channels that can let the dog's waste fluids (urine) pass through the mat and be absorbed by coconut soil below the mat, while the mat 24 retains the dog's waste solids on top. The solids can then be removed by the owner of the dog and the pad 20 continued to be used. In some embodiments, the coconut mat 24 has small additional holes that allow liquid to penetrate more rapidly through to the coconut soil 30 (FIG. 3) below it.

The thickness of the mat 24 can be of various sizes in relation to various parameters such as the outdoor conditions for composting or biodegradation, or the type of dog that is using the pad 20. The mat 24, after being exposed for a duration of a few weeks to an outdoor environment, starts to fall apart. The fibers from the mat 24 become detached from each other as the adhesive decomposes. The system 10 is made in such a way that, when the system has been used for a duration of two weeks or so, the user can discard the pad 20 as a whole directly into a compost bin. Every material used in the system 10 is either compostable or biodegradable, or both.

Figure 3:
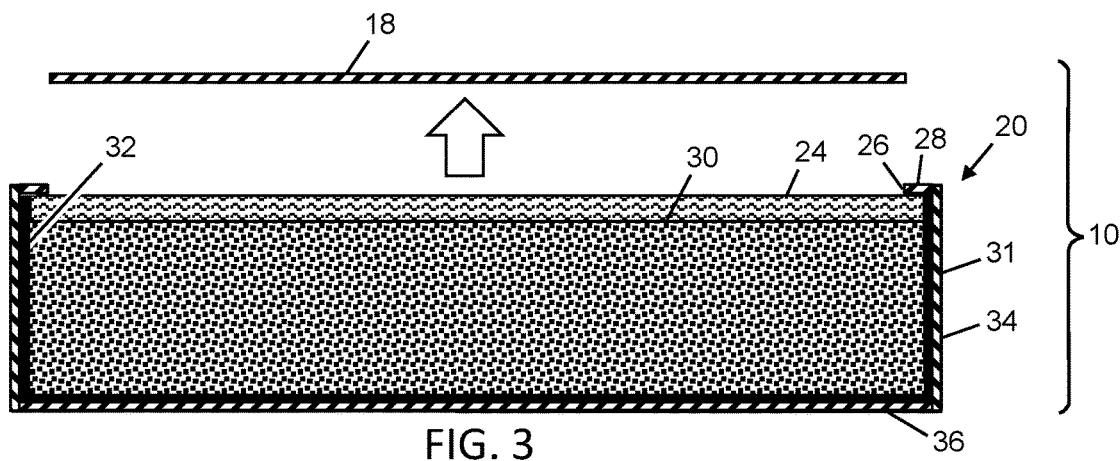
FIG. 3 is a drawing representing a cross-sectional elevation of the system, according to an embodiment of the present invention.

Referring to FIG. 3, the system 10 is shown with the lid 18 removed from the box 12. Below the mat 24 is a volume of coconut soil 30, and lining the inner floor and walls of the box 12 is a liner 32.

The top panel 28 of the opened box 12 overhangs the mat 24. As the opening 26 of the box 12 is smaller than the coconut mat 24, the overhanging panel 28 keeps the coconut mat 24 inside the receptacle 31, which is the part of the box 12 that remains when the lid 18 has been removed. This prevents the dog from knocking the mat 24 off the receptacle 31 or out of the pad 20. The overhanging panel 28 keeps the coconut mat 24 inside the receptacle 31 when the box is upside-down. In turn, the mat 24 retains the soil 30 inside the receptacle 31, also when the box is upside-down. The mat 24 may be referred to in general as a retaining coconut layer. The overhanging panel 28 may extend around the whole perimeter of the opening 26 of the receptacle 31, or may extend around one or more portions of the perimeter. The overhanging panel 28 performs a similar function in different embodiments, in which the pad layers are different.

The inside of the walls 34 of the receptacle 31 and the inside of the base 36 of the receptacle are covered by a liner 32. The liner 32 acts as a barrier and prevents the moisture captured by the coconut soil 30 and mat 24 from being absorbed by the base 36 and sides of the receptacle 31, which may be uncoated corrugated cardboard, for example. The liner 32 may be made of natural materials such as a biodegradable polymer and is, for example, a plant grade or vegetable grade plastic. In some embodiments, the liner 32 may be certified as compostable, for example in a residential compost or commercial green waste facility that is capable of composting hydrophobic coatings and liquids.

In some embodiments, the biodegradable liner 32 is a biodegradable coating applied directly onto the inner surfaces of the receptacle 31. A fully compostable coating, for example, FlexShield™ may be coated onto cardboard or paperboard and used for the receptacle 31. In some embodiments, a simple biodegradable polymer sheet or membrane is placed inside the box without being bonded to the surfaces of the walls and floor of the receptacle 31. In other embodiments, a simple biodegradable polymer sheet or membrane is bonded onto the inner surfaces of the walls and bottom of the receptacle 31 using biodegradable adhesive. In some embodiments, the liner 32 and box 12 are made of hemp, which may in some cases be more sustainable than cardboard, which is wood-based.

The coconut soil 30 is made up of ground coconut shells. In some cases, the coconut soil 30 contains ground husks as well as ground shells. In general, the coconut soil layer 30 may be referred to as an absorbent coconut layer. These parts of the coconut have a strong ability to retain moisture, and are more effective in comparison with wood chips or wood bark, or earth's own decomposed soils used for growing grass, vegetables or other plants, for example. Moreover, this type of non-living, coconut soil 30 does not encourage the presence of bugs or worms, in contrast, for example, to a living soil. In addition, while bark or wood chip materials are able to retain some moisture, they have a high chance of carrying bugs or insects, which can be an issue for indoor use. Also, wood chips can cause harm to the dog's paws.

The present system may be more breathable than dog waste collecting systems using other organic living material. The present system is also more sustainable than a wood-chip-based system. It requires 12 months for a mature tree to produce coconuts ready to be harvested. The growth cycle time for wood chips is much longer and therefore a wood-chip-based system requires wood from trees that require 10-30 years to be replaced. In addition, these trees have to be cut down in order to be processed for wood chips. Furthermore, using a coconut rather than its tree is not harmful in anyway to the coconut tree, and the fruit if not used will go to waste.

Figure 4:
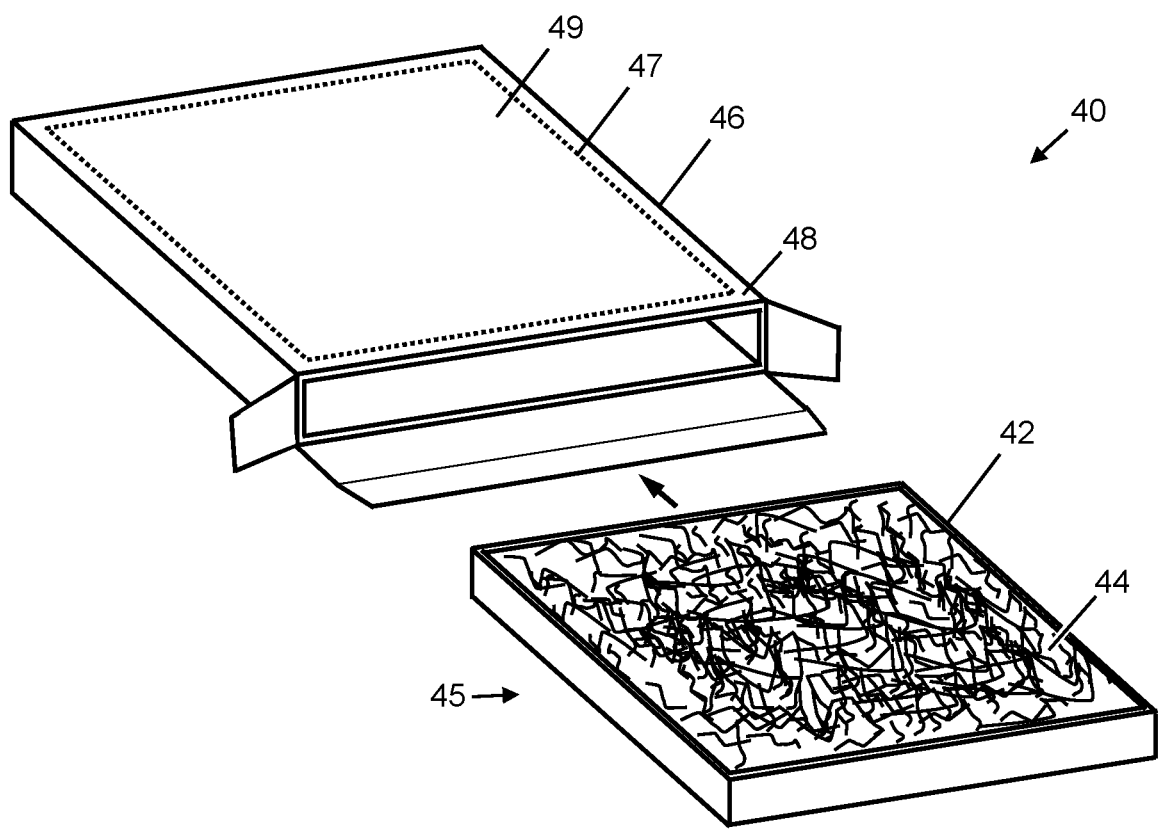
FIG. 4 is a perspective view of a pad and its box, according to another embodiment of the present invention.

Referring to FIG. 4, there is shown another embodiment 40 of the present invention. In this embodiment, the box for the dog waste system has two components: a cardboard receptacle 42 (or tray) with the coconut mat 44 and a cardboard sleeve 46 with perforations 47 that define an overhang 48. The receptacle 42 with the mat 44 and underlying layer of coconut soil form a pad 45. The pad 45 slides into the sleeve 46. In this embodiment 40, the overhang 48 maintains the mat 44 inside the receptacle when the central part 49 or lid of the top panel of the sleeve 46 is removed by breaking it away from the perforations 47. When the lid or central part 49 is removed, the remainder of the box becomes part of the pad. However, in other embodiments, there may be no overhang, or the overhang may be incorporated into the receptacle 42. In some embodiments, the sleeve 46 is made of a different compostable material than the receptacle 42.

Figure 5:
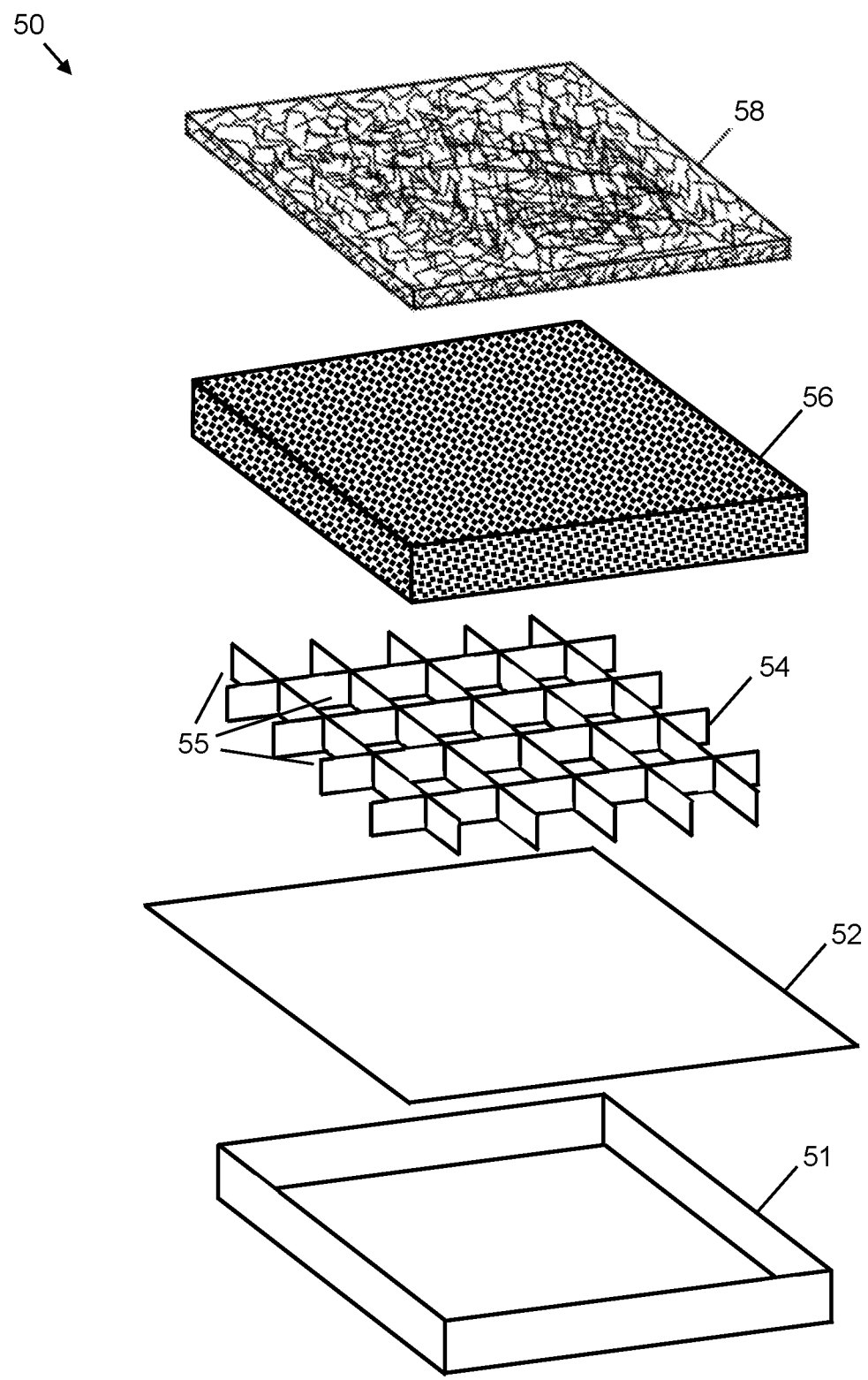
FIG. 5 is an exploded perspective view of a pad with loose coconut soil, according to an embodiment of the present invention.

Referring to FIG. 5, there is shown an exploded view of components of the pad 50 of another exemplary dog waste collecting system. The pad 50 has a receptacle 51 as its base, with a biodegradable liner 52, a cell divider 54 with cells 55 for the coconut soil 56, and a coconut mat 58. The biodegradable liner 52 is laid on the bottom, inner surface of the receptacle 51 and against its inner sides. The cell divider 54 is set over the biodegradable liner 52 inside the receptacle 51, so that its top edges lie lower than the top edges of the receptacle. The coconut soil 56 is placed inside the cells 55 of the cell divider 54.

The cell divider 54 plays an important role in maintaining the average level of the coconut soil 56 in the receptacle 51, and to keep the coconut mat 58 level and flush with the top edge of the receptacle. If the receptacle 51 is moved or tilted by the user or during shipping, the coconut soil 56 will not entirely slide to one of the corners or sides of the receptacle 51, and will remain more or less well distributed across the receptacle, within each cell 55 of the cell divider 54, with substantially similar amounts of coconut soil 56 remaining within each cell of the cell divider. The cell divider 54 also helps to evenly distribute a dog's weight when the dog stands on the mat 58 of the pad 50. The presence of the coconut soil 56 also helps to reinforce the strength of the cell divider 54.

The coconut mat 58 is placed over the coconut soil 56 and cell divider 54, and the upper surface of the coconut mat is level or approximately flush with the top edges of the receptacle 51, such that the amount of coconut soil 56 that passes from one cell 55 to the next when the pad is tilted or upturned is negligible. In some embodiments, the mat 58 may lay slightly over-flush with the top edge of the receptacle 51, so that it must be compressed in order to slide the pad 50 into its sleeve 46 (FIG. 4) to complete the unit during manufacture. This compression will further help retain the coconut soil 56 within the individual cells 55, by creating additional pressure between the lower edges of the cell divider 54 and the floor of the receptacle 51, and between the top edges of the cell divider and the lower surface of the mat 58.

The overhang 48 formed by the border of the top panel of the sleeve retains the coconut mat and the coconut soil 56 in the receptacle when the pad 50 is in use. In other embodiments, there may be an overhanging upper panel of the receptacle 51 that retains the mat 58 and other components in place in the receptacle.

Figure 6:
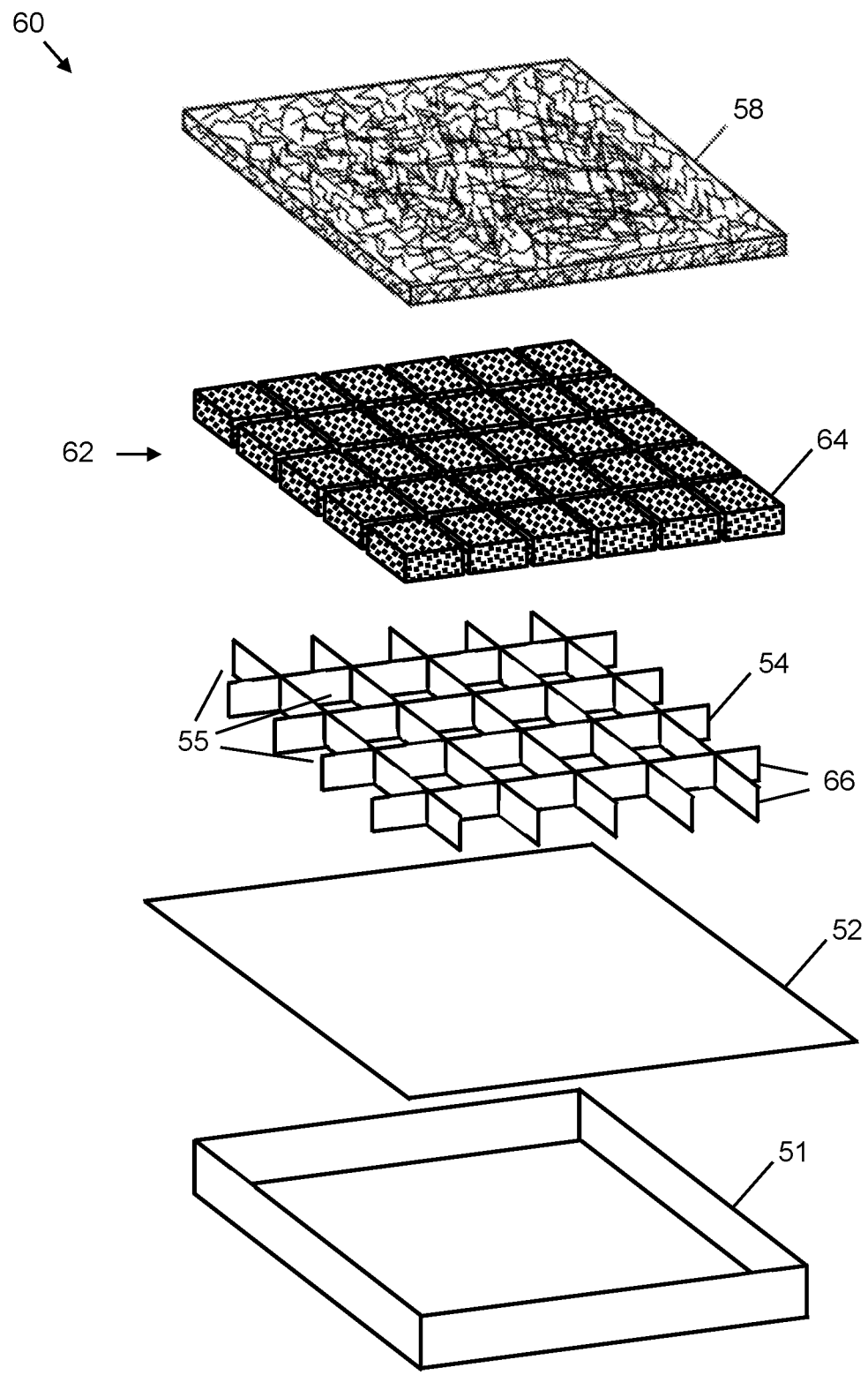
FIG. 6 is an exploded perspective view of a pad with bricks of coconut soil, according to an embodiment of the present invention.

Referring to FIG. 6, there is shown an exploded view of components of a pad 60 of another exemplary dog waste collecting system. It is similar to the previous embodiment of pad 50 (FIG. 5), in that is has a receptacle 51 as its base, with a biodegradable liner 52, a cell divider 54 with cells 55, and a coconut mat 58. The difference in pad 60 is that the coconut soil layer 62 is an array of coconut soil bricks 64, with one brick being placed in each of the cells 55 of the cell divider 54. The coconut soil bricks 64 are typically bone dry, compressed coconut soil. The coconut soil bricks 64 are typically rigid, and are cut to size or formed to fit in the cells 55. Normally, there are no bugs in the coconut soil bricks 64.

The coconut soil layer 62 is divided into multiple bricks 64 to reduce the effect of swelling of the bricks as they absorb liquids predominantly from their surfaces. As the bricks 64 absorb liquids, they expand, and if the liquids are absorbed predominantly from their lower surfaces, they will tend to bend upwards at their edges. If the liquids are absorbed predominantly on the upper surfaces, the bricks will tend to bow upwards in their centers. The effect will be larger with larger bricks. If the swelling and resulting bowing is too great, then some of the dog's urine that passes through the mat 58 may run to the side of the pad 60 before being absorbed, or some of the urine may even run off the top of the mat 58 if it becomes domed too much.

The presence of the cell divider 54 is also useful when the coconut soil layer 62 is made of coconut soil bricks 64. The cell divider 54, when made of corrugated cardboard, for example, allows for some compression of its dividing walls 66. This allows the coconut soil bricks 64 to be fitted snugly into the cells 55. The dividing walls 66 also take up some of the expansion of the coconut bricks 64 as they absorb liquids and swell.

In some embodiments, there may be fewer or more coconut soil bricks 64 than shown here. In other embodiments, there may be a coconut brick layer 62 that does not have the cell divider 54. For example, the coconut soil bricks 64 may be fewer in number and larger (e.g. four bricks), and they may be dimensioned so that there is an allowance between them for their expansion as they absorb liquids, provided of course that they are not so large as to significantly deform when absorbing liquids.

Figure 7:
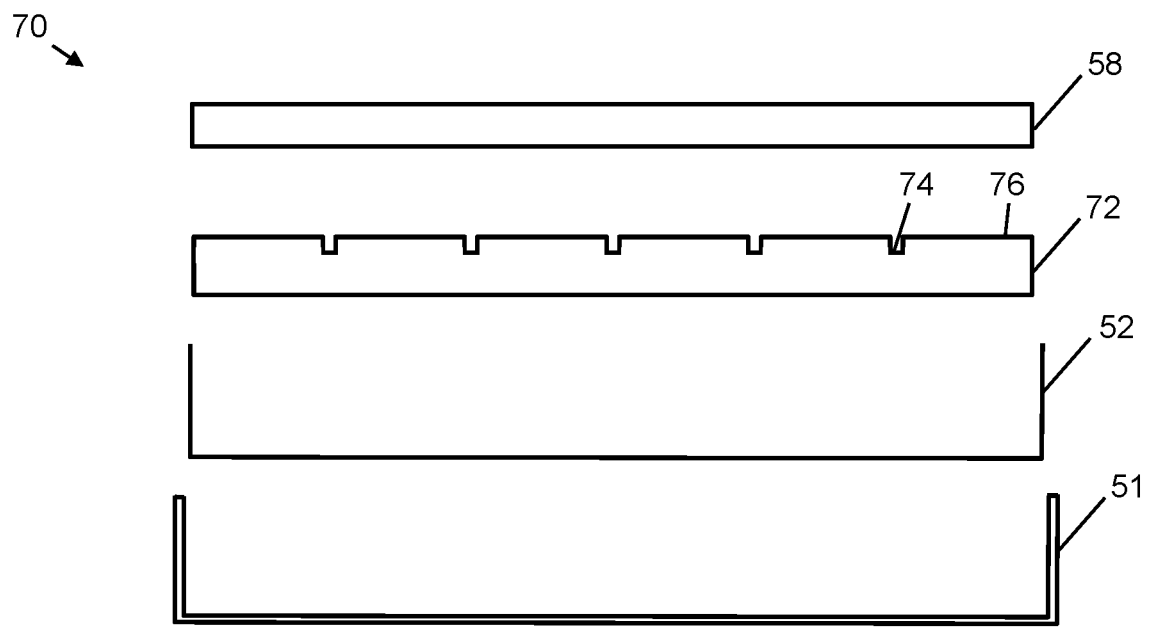
FIG. 7 is an exploded side sectional view of a pad with a coconut sponge layer, according to an embodiment of the present invention.

Referring to FIG. 7, there is shown an exploded view of the pad 70 of another exemplary dog waste collecting system. It is similar to the previous embodiments of the pad, in that it has a receptacle 51 as its base, with a biodegradable liner 52, and a coconut mat 58. The difference is that the coconut soil layer is in the form of a sponge 72. This coconut sponge is made from partially compressed and dried coconut soil, which is held together with a biodegradable binder. The coconut sponge 72 is typically less compressed than the coconut soil bricks 64. The coconut sponge may be in the form of a plain mat, or, as shown, it may have channels 74 formed in it to leave raised portions 76. The channels 74 may help to distribute some of the fluids that pass through the mat 58.

Figure 8:
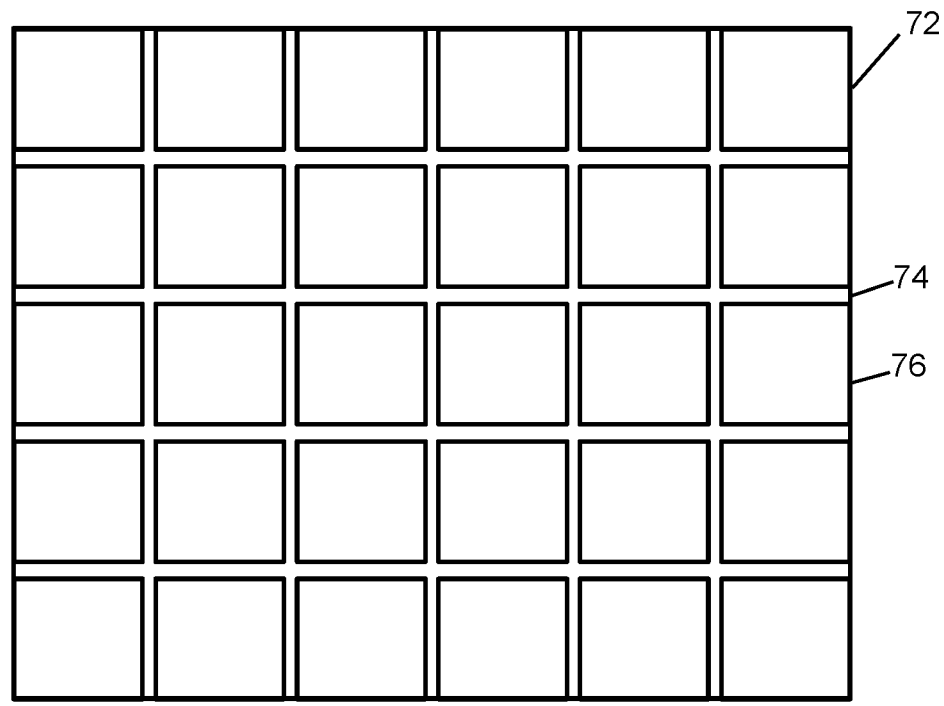
FIG. 8 is a top view of a coconut sponge layer, according to an embodiment of the present invention.

FIG. 8 shows that the channels 74 in the coconut sponge 72 may form a grid pattern between the raised portions 76. The sponge form of the coconut soil layer shows negligible swelling when compared to the coconut soil bricks 64. As a consequence, the coconut sponge layer can be made in a single piece, and the cell divider is not needed.

Figure 9:
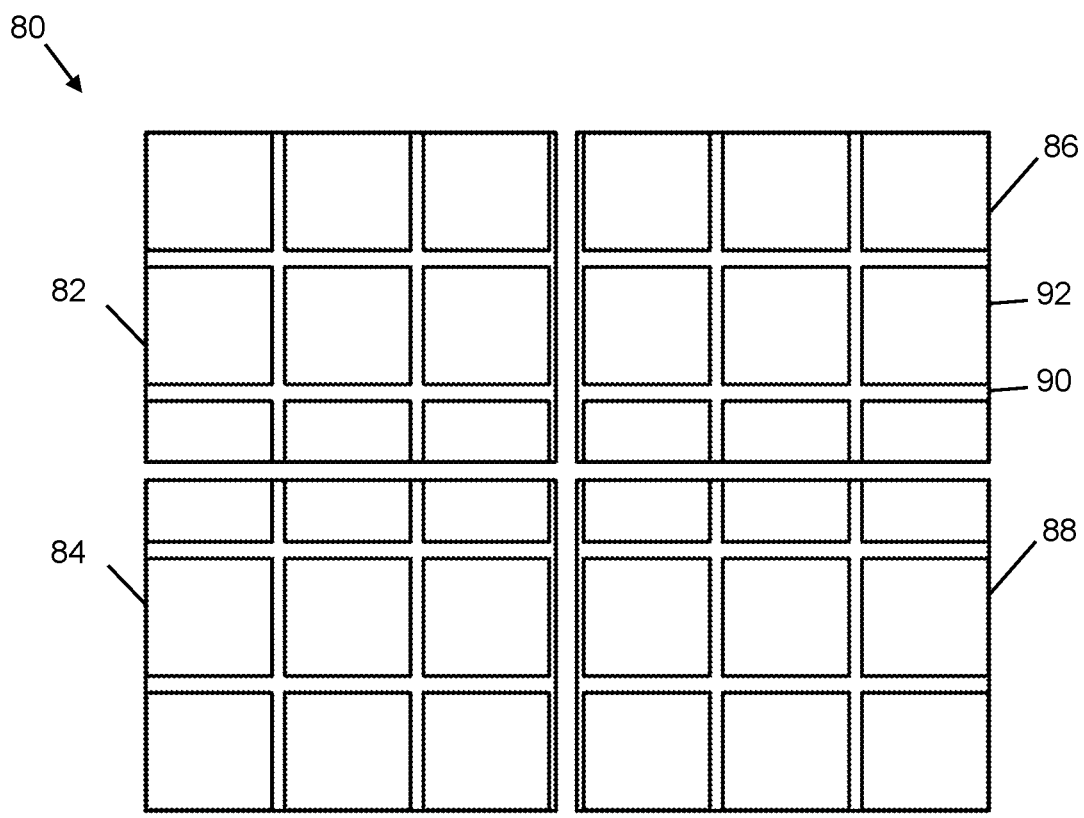
FIG. 9 is a top view of a segmented coconut sponge layer, according to an embodiment of the present invention.

Referring to FIG. 9, another example of the coconut sponge layer 80 shows that it can be made in four parts 82, 84, 86, 88, with channels 90 that define raised portions 92.

Figure 10:
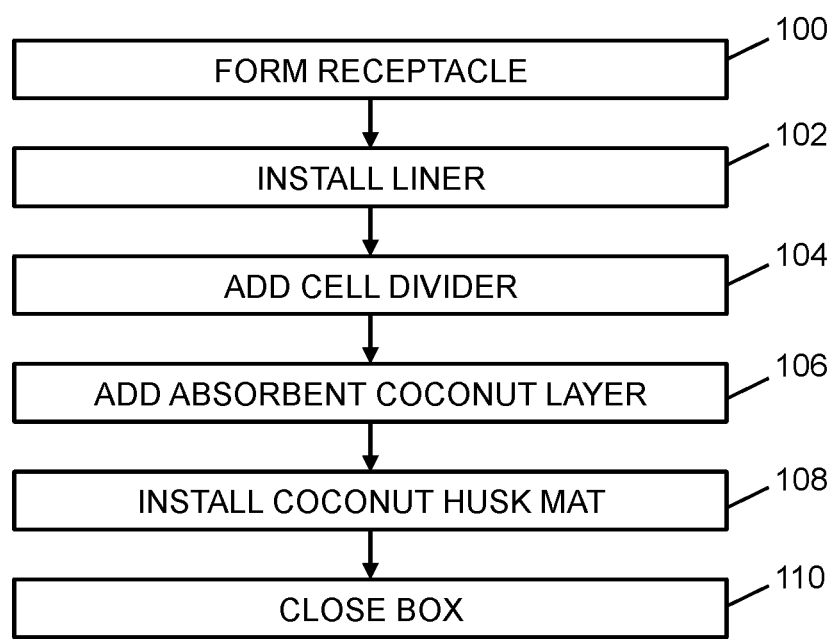
FIG. 10 is a flowchart representing the key steps for the assembly of the system for collecting dog waste, according to an embodiment of the present invention.

Referring to FIG. 10, there is shown a flowchart representing the key steps for the assembly of an exemplary dog waste collecting system. Starting from a flat piece of cardboard that has been die cut, pressed with fold lines and perforated, in step 100, the cardboard receptacle (or tray) is formed by folding the flat piece of cardboard and tucking in any flaps that need to be put in place to form the receptacle.

A biodegradable leak proof liner is laid on the inner surface of the base of the receptacle and on the inner surfaces of the side walls of the receptacle, in step 102. The liner may need to be folded in order to fit close up to the walls and base of the receptacle. This step is optional if the flat piece of cardboard is already coated with a leak proof liner. In other embodiments, the liner may be pre-folded and glued to retain the fold lines, so that it appears itself to be a tray shape. The glue or adhesive used is compostable.

In step 104, a cell divider is placed over the liner in the receptacle, depending on the embodiment. In embodiments where coconut soil is used, then the cell divider is used. In embodiments where coconut soil bricks are used, then the cell divider may be used. In embodiments where the coconut sponge layer is used, then the cell divider is not necessary. However, if the sponge layer is made of multiple smaller sponges, then the cell divider may be used and a sponge placed in each cell.

Then, in step 106, the absorbent coconut layer is added, which may be a layer of loose coconut soil, compressed coconut soil in the form of bricks, or coconut soil in the form of a sponge. If loose coconut soil is used, it is poured into the receptacle until it reaches a certain height in the receptacle, which is no greater than the height of the cell divider, which will be present in this embodiment. The level of the coconut soil leaves a space between the top surface of the soil, when evenly spread, and the top of the side walls of the receptacle. If coconut soil bricks are used, then these are placed in the cells of the cell divider. In some embodiments, multiple, smaller coconut soil bricks may be inserted into each cell of the cell divider. If the coconut soil sponge is used, then it is placed on the liner without the cell divider.

Next, the coconut mat, made from coconut husk, is installed on the upper surface of the coconut shell layer, in step 108. If an overhanging top panel of the receptacle is present, then the mat is tucked under the overhang. In some embodiments, the overhang may be formed after the mat has been placed. The coconut mat has a thickness about equal to the difference in height between the top edges of the cell divider or absorbent coconut layer, whichever is the higher, and the top of the inside surfaces of the side walls of the receptacle. In some embodiments, the fit of the mat with the inner walls and/or liner is a snug fit so that, when the system in inverted, the soil does not fall around the edges of the mat and into the space that is normally above the mat.

Then, in step 110, the box is closed. If the system is in two parts, the assembled pad slides into a sleeve and is sealed or otherwise fastened. If the box is a single piece, the lid is folded over to cover the receptacle part of the box and is sealed or otherwise fastened. In some embodiments, the closure and receptacle parts of the box are already attached together as parts of the same flat piece of cardboard. The closure part of the box is then folded over the base part of the box. In some embodiments, the closure part of the box has flaps that tuck into slots located in the receptacle part of the box for closing the box.

The lid or sleeve, and receptacle parts of the box are sealed together using, for example, biodegradable adhesive. In some embodiments, biodegradable tape is used to seal the box.

C. Variations

While particular dimensions have been given for one embodiment, other dimensions are possible in other embodiments, and may depend, for example, on the size of the dog.

While specific examples of the shape and format of the box have been shown, other embodiments are possible. The main requirement of a box is that it is entirely biodegradable, retains the coconut soil and mat layers, and is openable to expose the mat. A further requirement may be that the box is entirely compostable.

Coconut soil bricks may be made with different shapes in other embodiments. For example, they may be round. They may have internal cavities, for example, or interlocking structural features, or they may be in the form of pellets.

In some embodiments, other compostable material is used in place of cardboard for the box.

In some embodiments, a sponge layer may be used without the mat, and the overhang would retain the sponge layer in the receptacle.

In some embodiments, coconut wood chips may be used, either loose or compressed into bricks. In either case, the cell divider is used. In some embodiments, coconut pellets may be used.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. Accordingly, the specification is to be regarded in an illustrative, rather than a restrictive, sense.

It will be clear to one having skill in the art that further variations to the specific details disclosed herein can be made, resulting in other embodiments that are within the scope of the invention disclosed. Features from different embodiments may be combined in other embodiments. All dimensions and configurations described herein are examples only and actual ones of such depend on the specific embodiment. Accordingly, the scope of the invention is to be construed in accordance with the substance defined by the following claims.

The invention claimed is:

1. A system for collecting dog waste comprising:
   a biodegradable receptacle;
   a biodegradable leak proof liner inside the biodegradable receptacle;

a biodegradable cell divider on the biodegradable leak proof liner;

a biodegradable absorbent coconut layer on the biodegradable leak proof liner, comprising coconut soil bricks that are distributed in cells defined by the biodegradable cell divider; and a biodegradable coconut fiber mat over the biodegradable absorbent coconut layer and the biodegradable cell divider.

2. The system of claim 1, wherein all components of the system are compostable.

3. The system of claim 1, wherein the biodegradable receptacle has an overhang projecting inwards from an upper edge of a wall thereof, the overhang retaining the biodegradable coconut fiber mat in the biodegradable receptacle.

4. The system of claim 1, comprising a biodegradable closure for the biodegradable receptacle, the biodegradable closure comprising a biodegradable lid or a biodegradable sleeve.

5. The system of claim 4, wherein the biodegradable closure has perforations defining a detachable portion.

6. The system of claim 4, comprising biodegradable tape that seals the biodegradable closure.

7. The system of claim 1, wherein:
the biodegradable receptacle is cardboard; and
the biodegradable coconut fiber mat comprises a biodegradable adhesive that is water based, plant based or natural rubber based.

8. The system of claim 1, wherein the biodegradable leak proof liner is coated onto a floor and inner walls of the biodegradable receptacle.

9. A method for making a dog waste collecting system comprising:
providing a biodegradable receptacle;
providing a biodegradable leak proof liner inside the biodegradable receptacle;
placing a biodegradable cell divider on the biodegradable leak proof liner;
placing a biodegradable absorbent coconut layer on the biodegradable leak proof liner, comprising coconut soil bricks distributed in cells defined by the biodegradable cell divider;
placing a biodegradable coconut fiber mat over the biodegradable absorbent coconut layer and the biodegradable cell divider; and
closing the biodegradable receptacle with a biodegradable closure, the biodegradable closure comprising a biodegradable lid or a biodegradable sleeve.

10. The method of claim 9, comprising:
removing a portion of the biodegradable closure to reveal the biodegradable coconut fiber mat for using the dog waste collecting system; and
retaining the biodegradable coconut fiber mat in the biodegradable receptacle with an overhang projecting inwards from an upper edge of a wall thereof.

11. The method of claim 9, comprising sealing the biodegradable closure with a biodegradable tape.

* * * * *